(No Model.)

C. J. VAN DEPOELE.
REGULATOR FOR ELECTRIC APPARATUS.

No. 285,528. Patented Sept. 25, 1883.

Attest.
W. T. Robertson.
E. Scully.

Inventor.
Chas. J. Van Depoele
By Thos. S. Sprague
Atty.

UNITED STATES PATENT OFFICE.

CHARLES J. VAN DEPOELE, OF CHICAGO, ILLINOIS.

REGULATOR FOR ELECTRIC APPARATUS.

SPECIFICATION forming part of Letters Patent No. 285,528, dated September 25, 1883.

Application filed April 21, 1883. (No model.)

*To all whom it may concern:*

Be it known that I, CHARLES J. VAN DE-POELE, of Chicago, in the county of Cook and State of Illinois, have invented new and useful Improvements in Regulators for Electric Apparatus; and I hereby declare that the following is a full, clear, and exact description thereof, reference being had to the accompanying drawings, which form a part of this specification.

This invention relates to new and useful devices to be employed in connection with dynamo-machines adapted to automatically change the polarity of the device with relation to a stationary point.

The invention consists in an electro-magnetic device so constructed and arranged that its polarity can be shifted so as to occupy a different place upon said device, and thus give a change of position or give motion to the device by changing the point of attraction with relation to a stationary point, as more fully hereinafter described.

Figure 1:
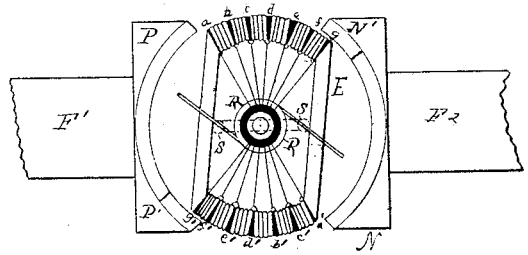
Figure 2:
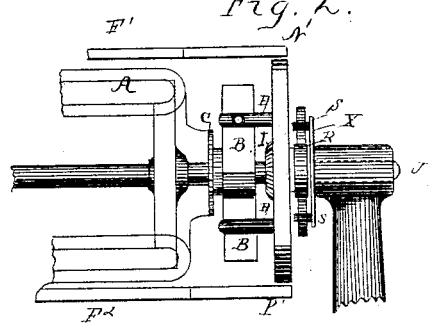
Figure 4:
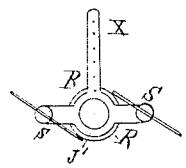
Figure 3:
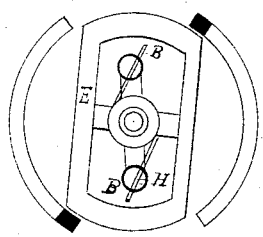

Figure 1 is an elevation showing a device for the purpose attached to a dynamo-machine, and arranged to automatically change the position of the brushes as the force required of the machine may demand. Fig. 2 is a side elevation of the same, the dynamo partially in section. Fig. 3 is a detail; Fig. 4, a detached elevation of a carrier provided with brush-holders and brushes.

In the accompanying drawings, A represents the armature of the dynamo-electric machine;
B, the brushes, and C the commutator, of any of the known constructions.

I is a sleeve fitting loosely upon the shaft or journal J, and to this sleeve is secured the iron frame E, so that it may move freely upon its center or shaft.

F' and F² represent the field-magnets, with their faces or poles N and P. N' and P' represent polar extensions upon the poles of said field-magnets. The polar extremities of the frame E are provided with depressions, (not shown,) to receive the copper-wire conductors or helices of the system, as shown in Fig. 1, and connected up as in the Pacinotti ring, having its different coils connected to a commutator, R, which is held stationary, so as not to move with the vibrations of the frame E.

S are brush-holders and brushes, fastened to a carrier, X, so arranged that by moving said carrier around the commutator the currents can be shifted to issue from corresponding sections, and thus change the polarity in the frame. R is the commutator of the device, for the coils $a\ b\ c\ d$, &c., fastened rigidly to a bearing or collar, J', and provided with brush-holders and brushes S, intended to shift the current around the commutator R, so as to produce the necessary motion in the frame E with regard to the polar extensions N' P'. H are the brush-holders, carrying the brushes B.

Having described the different parts of my invention, I will now proceed to explain the operation of the same.

As here shown, the device is used to change the position of the brushes around the commutator of a dynamo-electric machine, although the device can be applied to a variety of uses. N' and P' are two points upon which E E is to act by attraction or repulsion, as the case may be. N' and P' can be replaced by two poles of an ordinary magnet, or even two pieces of iron. On connecting the two brushes S S to some source of electricity, the current will pass through the coils $a\ b\ c\ d\ e$, &c., as it would in a circular armature, and the north or south poles will correspond to the opposite helices in E E, corresponding to the sections of the commutator where the brushes are bearing upon. Now, by moving the brushes S S around the stationary commutator R, I change the position of the poles in E E. Suppose the current enters, as shown in Fig. 1, by the section in commutator corresponding to $g$ and out at $g'$, the poles will be situated at $g$ and $g'$; but by moving the brushes S S—say to $d$ and $d'$—the poles will be at $d$ and $d'$, so that P' and N' will attract or oscillate E E until $d$ and $d'$ are opposite N' and P', and so on for any position at which the brushes may be placed, the polarity in E E will correspond to the coils where the current is entering and leaving. So long as the current is passing in and out as above described the polarity in the frame E E will remain in the same place; but by making the current enter and leave at a different point, the polarity will be changed correspondingly, and can thus be made to act upon N' and P'.

The frame E E can be made in the shape of a complete ring and answer the above purpose, and so can R be made to move, and S S be kept stationary without departing from the spirit of my invention.

A device embodying the principles herein described forms the subject-matter of another application for Letters Patent filed of even date herewith.

Having described the different parts of my invention, what I claim as new, and wish to secure by Letters Patent, is—

1. An electro-magnetic regulating device provided with helices mounted upon segmental cores, and each connected to a separate commutator, section-brushes movable upon said commutator, and adapted to direct the current to the sections corresponding to the helices in said device, so as to change the point of attraction or polarity therein as desired, and connections between the regulator and main commutator-brushes of a dynamo-electric machine, whereby, when said regulator is located in juxtaposition to the field-magnets, it will automatically shift the said brushes in response to the varying attractions of said field-magnets, as set forth.

2. An electro-magnetic device capable of being oscillated upon its center by the action of the displacement of the magnetic polarity upon the extremities of the device, and consisting of the magnetic frame E E, oscillating upon a central sleeve or collar, its helices $a\ b\ c\ d\ e\ f\ g$, connected by proper conductors to stationary commutator R, in combination with the carrier X, brush-holders and brushes S S, loosely placed upon a proper bearing, enabling said brushes to be moved around its stationary commutator in order to change the position of polarity in the device, as above specified, and for the purpose set forth.

CHARLES J. VAN DEPOELE.

Witnesses:
ALEXANDER J. R. FIEGO,
THEO. P. BAILEY.